Jan. 3, 1967  A. FISHER  3,296,472
SERIES DIRECT CURRENT MOTOR FIELD POLES
Original Filed Sept. 18, 1963
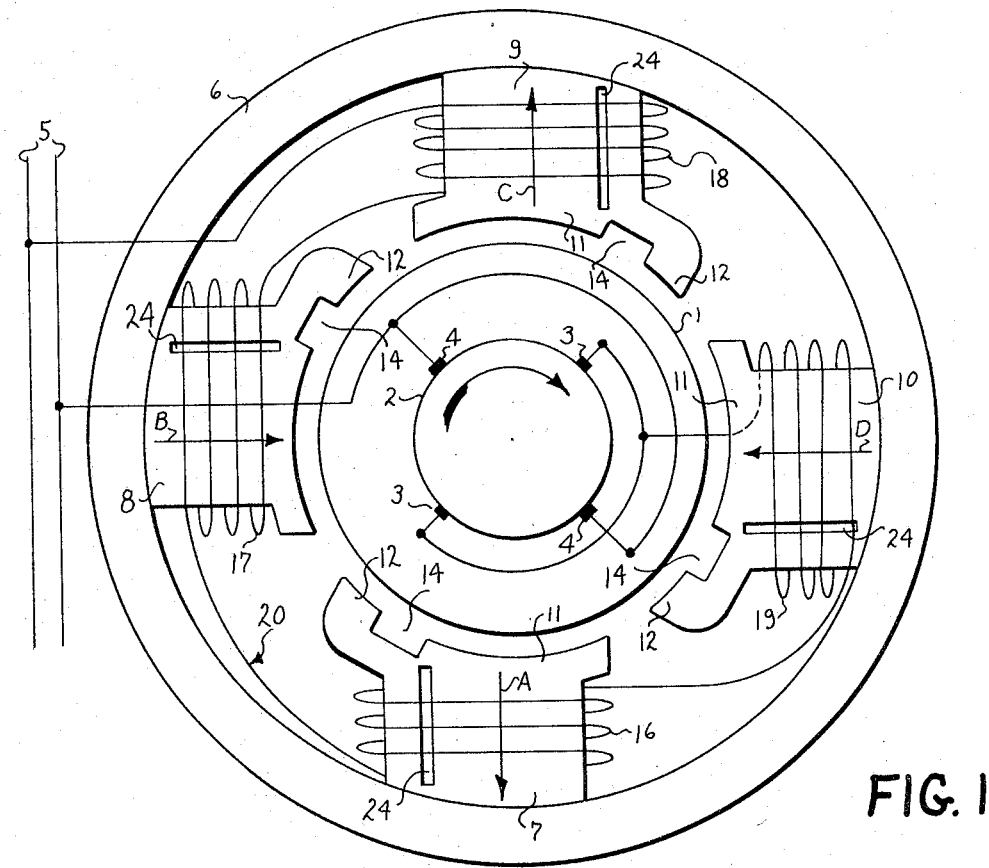
FIG. 1
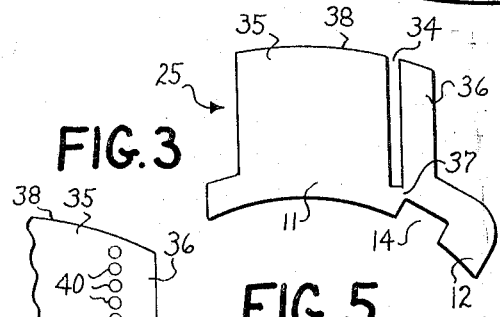
FIG. 3
FIG. 5
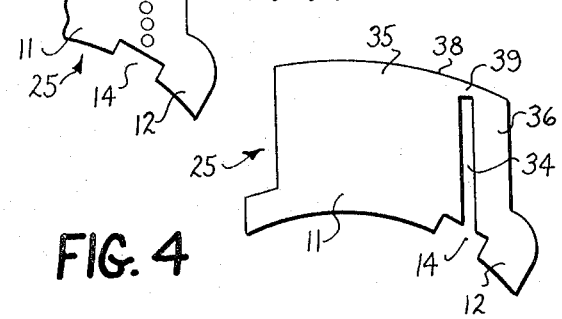
FIG. 4
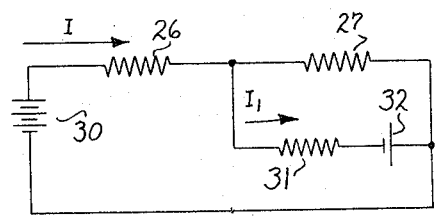
FIG. 2
INVENTOR.
ALEC FISHER
BY
HIS ATTORNEY

United States Patent Office 3,296,472
Patented Jan. 3, 1967

3,296,472
SERIES DIRECT CURRENT MOTOR FIELD POLES
Alec Fisher, 444 W. 9th St., Erie, Pa. 16502
Continuation of application Ser. No. 309,742, Sept. 18, 1963. This application June 21, 1966, Ser. No. 559,338
4 Claims. (Cl. 310—186)

This application is a continuation of my copending application Serial No. 309,742, filed September 18, 1963, now abandoned.

This invention relates to direct current motors and more particularly to such motors of the type known as series direct current motors wherein the main field excitation is provided by a winding connected in series with the armature circuit of the machine.

It has long been known in the art to provide direct current machines with commutating poles, also called interpoles, to neutralize the reactive voltage induced in the short circuited armature coil undergoing commutation in order to prevent brush sparking. These commutating poles, ordinarily placed midway between the main field poles, are provided with a winding which produces a flux essentially proportional to the armature current. The armature rotation plus this flux generates a speed-voltage in the short circuited armature coil which is in the proper direction to neutralize the reactive voltage. The use of commutating poles in machines of this type improves the commutation so much that on almost all high output machines they have become universally required in order to provide a machine with presently acceptable commutation characteristics. Since space must be provided in the field structure of the machine to accommodate these commutating poles and the additional windings therefor, there has heretofore been an upper limit on the maximum ratio of armature-to-frame diameter, as well as machine size-to-output, which could be achieved. This has been a serious disadvantage particularly since there are many applications for dynamoelectric machines of this type which can be made smaller without a corresponding reduction in their output capabilities. There are also ever increasing requirements for high performance, high armature reaction motors. Such high performance, high armature reaction motors require commutating poles to obtain high commutating ability while at the same time requiring a small diameter frame and a high ratio of armature-to-frame diameter. Since the existence of reactive voltage is impossible to prevent and must be neutralized by the use of commutating poles, attainment of these requirements has, heretofore, been extremely difficult and expensive.

It is an object of this invention, therefore, to provide a new and improved construction for series, direct current motors which substantially overcomes one or more of the prior art disadvantages and is less expensive.

It is a further object of this invention to provide series, direct current motors having a high ratio of armature-to-frame diameter without any reduction in the operating characteristics thereof over the full operating range of the machines.

It is yet another object of this invention to provide high performance, high armature loaded series direct current motors having a smaller frame size, a larger ratio of armature-to-frame diameter and a simpler field configuration, together with excellent commutation characteristics.

Briefly stated, in accordance with one aspect of this invention, my new and improved motor comprises a field structure having a plurality of salient polar members arranged for coaction with an armature. Each of the polar members has a core and a region which terminates near the armature in a first portion, which defines a main field pole shoe, and a second portion, spaced a predetermined distance therefrom, which defines a commutating pole shoe. A winding, connected in series with the armature circuit of the machine, is positioned on the core and arranged to provide magnetic excitation for the polar members. Each polar member further includes a high reluctance region disposed in the core thereof intermediate the main and commutating pole shoes which is effective to establish two essentially separate flux paths in each polar member so that saturation of the portion thereof associated with the commutating pole shoe is independent of the saturation of the portion associated with the main pole shoe.

The novel features believed characteristic of this invention are set forth with particularity in the appended claims. The invention itself, however, together with further objects and advantages thereof, may best be understood by reference to the following description taken in conjunction with the accompanying drawing in which:

FIG. 1 is a diagrammatic representation of a series direct current motor in accordance with one embodiment of this invention;

FIG. 2 is a schematic diagram of the electromagnetic circuit of the motor of FIG. 1; and, FIGS. 3–5 illustrate different configuration of field members suitable for use in the construction of other embodiments of the motors of this invention.

In FIG. 1 there is shown a series direct current type motor provided with an armature 1, which may be of any desired type, having a commutator 2 to which power is supplied by pairs of brushes 3 and 4 connected to the lines 5—5 of a suitable power source. Magnetic excitation is provided to armature 1 by a field structure arranged as the stationary member of the motor. The field structure includes a magnetic yoke 6 and a plurality of magnetizable members, such as the salient polar members 7, 8, 9 and 10. Each of the polar members 7–10 terminates at an end of the yoke 6 and at the other end near the armature 1 in a first portion, defining a main field pole shoe 11, and a second portion defining a commutating pole shoe 12.

Usually the polar members 7–10 are so constructed that the center of commutating pole shoe 12 is on the line of the mechanical neutral of the motor as is well-known practice in the art. Similarly, although shown in FIG. 1 as having the same air gap, the air gap of the commutating pole may be made different than the air gap of the main pole as is often done to increase the linearity between the magnetomotive force and commutating pole flux.

A notch 14, extending the entire axial length of the polar members provide for a predetermined spacing between the main field pole shoe 11 and the commutating pole shoe 12 and establishes a suitable neutral zone so that the direct main pole flux and the quadrature commutating pole flux act independently, effectively shielding the coils undergoing commutation from the influence of main pole flux.

Polar members 7, 8, 9 and 10 are arranged to be magnetically excited by respectively associated coils 16, 17, 18 and 19 of an exciting winding, generally designated 20, connected to the brush pairs 3 and 4 so as to be in series with the armature circuit of the motor. As so connected, winding 20 produces an MMF which is proportional to armature current and a flux essentially proportional to current in the polar portion 12. The magnetic excitation provided by series exciting winding 20 is indicated on the polar members 7, 8, 9 and 10 by the arrows A, B, C and D respectively.

As is evident, a considerable space saving is achieved by combining the main and commutating poles into the single polar members 7, 8, 9 and 10 with the single exciting winding 20. Machines constructed in this manner, however, have been generally unsatisfactory due to poor commutation characteristics, at times little better than a machine constructed without commutating poles.

In further accord with this invention this difficulty is completely overcome and excellent commutation achieved by the provision of a high reluctance region intermediate the main and commutating pole shoes in each of the polar members 7, 8, 9 and 10 which effectively establishes two essentially separate flux paths therein. In FIG. 1 the high reluctance region is shown as the slot-like air gap region 24 provided in each of the polar members at a location intermediate the main and commutating pole shoes 11 and 12 to establish two essentially separate flux paths, one associated with the main pole shoe 11 and the other associated with the commutating pole shoe 12.

As shown in the various views of the drawing, the high reluctance region extends through the entire axial length of the polar members 7–10 and through a major portion of their radial length. This high reluctance region is located and dimensioned to reduce the amount of leakage flux, between the portions of the members associated with the main and commutating pole shoes respectively, to a very low value. The leakage flux should be provided of a low enough value that it has a small effect on the linearity of the flux in the portion of the member associated with the commutating pole shoe 12. In this way, magnetic saturation of the commutating pole portion of the members is essentially independent of the magnetic saturation of the main field pole portion thereof.

In constructing a motor in accordance with this invention, therefore, each of the polar members is provided as described so as to include, in a mechanically integrated member, two essentially separate flux paths, one associated with the main field portion thereof and the other associated with the commutating pole portion. The portion of each member associated with the main pole shoe is made of a sufficient size to carry the required main field flux and the portion associated with the commutating pole shoe is made of a sufficient size to carry the commutating pole flux. The high reluctance region, such as an air gap region 24, is disposed between these two portions and extends over a major portion of the radial length thereof so that the flux path of the main field pole portion is essentially independent of the flux path of the commutating pole portion. These polar members are suitably disposed to provide a field structure having the desired number of main field poles in a manner well known in the art. For example, for a four-pole machine, the poles may be disposed as illustrated in FIG. 1. It is to be understood that motors having any number of poles may be constructed incorporating the principles of this invention. Further, although the motor frame and field yoke 6 provide a common magnetic path in the electromagnetic circuit of the motor, it has little effect provided its magnetic saturation and MMF drop are not excessive.

Winding 20, having associated coils 16, 17, 18 and 19 positioned on the respective polar members 7, 8, 9 and 10, is selected to provide, when connected in series with the armature circuit of the motor, a flux at the commutating pole shoe 12 which is sufficient to cause the generation of a voltage in the coils undergoing commutation having a direction and magnitude to neutralize the voltages which oppose commutation. As will be understood by those skilled in the art, this neutralization of voltage need not be complete since the brush resistance may be utilized to aid commutation as is well known. The remainder of the magnetic circuit, frame, armature, air gap, etc., is then proportioned to assure the required main field pole flux being produced from this same number of turns in this common winding. The details and considerations with respect to the design of a magnetic circuit which will meet this latter requirement are well known in the art and, therefore, will not be further explained or described in detail herein.

The operation of the improved and simplified series direct current motors of this invention may be more simply explained by reference to FIG. 2, which is a schematic, electrical equivalent circuit diagram of the electromagnetic circuit of a portion of the motor. As shown, the reluctance 26 of the motor frame and the reluctance 27 of the main field pole portion of a magnetizable member, such as one of the polar members 7, 8, 9 or 10, are connected in series with the magnetomotive force of winding 20, shown schematically by battery 30. A path, including the reluctance 31 of the commutating pole portion in series with the opposing magnetomotive force due to armature reaction, shown schematically by the battery 32, shunts the reluctance 27 of the main pole portion of the magnetizable member.

Since the relutance 26 of the motor frame is small, the current $I_1$ in the current path shunting main pole reluctance 27 is almost wholly unaffected by any variation in the value of reluctance 27. Thus, the provision in a single mechanically integrated magnetizable member for two essentially separate flux paths by providing a high reluctance region therebetween makes it possible to achieve essentially a linear relationship between the flux in the main pole portion and the commutating pole portion of the magnetizable members. Machines constructed in accordance with this invention, therefore, are capable of achieving the space saving afforded by the simplified field structure, resulting from a combined main and commutating pole with a single exciting winding therefor, and the high commutating ability of the more complex field structure wherein a separate main and commutating pole and separate main and commutating pole windings are utilized.

FIGS. 3–5 illustrate different configurations suitable for providing two essentially separate flux paths in a mechanically integrated magnetizable member excited from a single series exciting winding positioned thereon. As shown, the magnetizable members include a core portion adapted to terminate at the yoke 6 of the motor and a region adapted to terminate near the armature and which includes a first portion, defining a main pole shoe and a second portion, spaced a predetermined distance therefrom, defining a commutating pole shoe. For example, each of the magnetizable members, designated generally by the reference numeral 25, comprises a main field pole portion 35, a commutating pole portion 36 and a flux path joining portions 35 and 36 together to form a mechanically integrated magnetizable member so that such portions are spaced apart along a major part of their radial length. This flux path is shown at 37 in FIG. 3 and at 39 in FIG. 4. One end of each of the portions 35 and 36 terminates near the armature of the motor to define respectively the main pole shoe 11 and the commutating pole shoe 12. Pole shoes 11 and 12, as described hereinbefore, are spaced apart a predetermined distance by the notch 14 extending the entire axial length of the magnetizable member 25.

As shown in FIG. 3, the individual magnetizable members have a single flux path 37 joining the portions 35 and 36 thereof and providing the required spacing therebetween along the major part of their radial length. When these members are incorporated into yoke 6, however, to form the complete field structure, a second joining flux path is established. For example, the air gap region 34 at the top portion, generally designated 38, of the magnetizable members is bridged by the yoke 6 so that when incorporated into the field structure the net result is similar to that produced by the slot-type of air gap region 24 shown in FIG. 1. As described hereinbefore, however, this common magnetic path provided by yoke 6 and the motor frame has little effect provided, as is usually the case, that its magnetic saturation and MMF drop are not excessive. Accordingly, flux path 37 is proportioned so as to provide the necessary mechanical strength to provide for maintaining the portions 35 and 36 as a single member. In addition, flux path 37 should be sufficiently small that the flow of flux between the portions 35 and 36 of the member 25 is limited to a low value so that the members exhibit two essentially separate flux paths.

In the configuration shown in FIG. 4, however, even after incorporation with yoke 6 to form the complete field structure of the motor, there is but a single flux path 39 joining the two portions 35 and 36. While this structure provides the best magnetic characteristics, in that the two flux paths are completely separated except for their termination in the common flux path provided by yoke 6, it may not be a sufficiently strong mechanical structure for some applications. I have found the slot-type air gap region 24 to provide a member having very good mechanical and magnetic characteristics for all applications so as to provide for the construction of high performance, high magnetic saturation motors more nearly approaching the desirable small diameter frame and high ratio of armature-to-frame diameter and having excellent commutating characteristics. Alternatively, in some applications a suitable high reluctance region may be provided by a plurality of holes 40 disposed along a major portion of the radial length of the member as shown in FIG. 5.

While there have been described what are at present considered to be the preferred embodiments of this invention, many changes and modifications, not departing from the invention, will occur to those skilled in the art. It is, therefore, intended in the appended claims to cover all such changes and modifications which come within the true spirit and scope of the invention.

What I claim as new and desire to secure by Letters Patent of the United States is:

1. An N-pole series direct current motor comprising:
   (a) an armature;
   (b) a field tsructure arranged for coaction with said armature and consisting of a field yoke having only N-magnetizable members projecting therefrom toward said armature and terminating near said armature in a pole face having an axially extending notch therein which divides said pole face into a main pole face portion and a commutating pole face portion with said notch providing a predetermined spacing therebetween, the center of said commutating pole face portion being located approximately on the line of the mechanical neutral of said motor;
   (c) a winding connected in series with the armature circuit of said motor and arranged on said magnetizable members to provide magnetic excitation therefor; and
   (d) a high reluctance region in each of said magnetizable members which extends throughout the major part of the radial length of the member and the entire axial length thereof and being effective to establish two essentially separate flux paths in each of said magnetizable members so that saturation of the path associated with the commutating pole face portion is independent of the saturation of the path associated with the main pole face portion.

2. The series direct current motor of claim 1 wherein said high reluctance region is provided by an air gap arranged as a slot in said magnetizable members.

3. An N-pole series direct current motor comprising:
   (a) an armature;
   (b) a field structure consisting of a yoke and N salient poles each including a pole core terminating at one end at said yoke and at the other end near said armature in a pole face the trailing pole tip of which extends a greater distance beyond the center line of said pole core than that of the leading pole tip, said pole face having a notch formed therein which extends throughout the entire axial length thereof and is located intermediate said trailing pole tip and the center line of said pole core to establish a neutral operating zone effectively dividing said pole face into main and commutating pole face portions with the center of said commutating pole face portion being located approximately on the line of the mechanical neutral of said motor, each of said salient poles having a high reluctance region therein located proximate said notch and extending through the entire axial length and the major part of the radial length of said pole to establish two essentially separate flux paths therein one path including the portion of the core on one side of said high reluctance region and the main pole face portion associated therewith and the other path including the portion of the core on the other side of said high reluctance region and a circumferentially directed portion joining said commutating pole face portion to said pole core at a location thereof remote from said yoke; and
   (c) a winding arranged on the pole cores of each of said salient poles and connected in series with the armature circuit of said motor to provide magnetic excitation for said salient poles, said winding producing an MMF which is a predetermined amount greater than the MMF at the axis of said commutating pole face portion due to armature reaction.

4. The series direct current motor of claim 3 wherein said high reluctance region is a narrow slot.

References Cited by the Examiner

UNITED STATES PATENTS

| | | | |
|---|---|---|---|
| 919,458 | 4/1909 | Poth | 310—218 |
| 1,045,159 | 11/1912 | Lundell | 310—224 |
| 1,244,868 | 10/1917 | Larsson | 310—224 |
| 1,637,887 | 8/1927 | Wilson | 310—187 X |
| 2,030,108 | 2/1936 | Hathaway | 310—186 |
| 2,417,120 | 3/1947 | Naul | 310—187 X |
| 2,773,999 | 12/1956 | Morrill | 310—172 |

FOREIGN PATENTS 19,056   5/1904   Sweden.

MILTON O. HIRSHFIELD, *Primary Examiner.*

J. J. SWARTZ, *Assistant Examiner.*